United States Patent
Rhee et al.

(10) Patent No.: US 11,546,147 B2
(45) Date of Patent: Jan. 3, 2023

(54) TIME DIVISION QUADRATURE HOMODYNE CV QKD SYSTEM

(71) Applicant: Korea Advanced Institute of Science and Technology, Daejeon (KR)

(72) Inventors: June-Koo Rhee, Daejeon (KR); Junsang Oh, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 120 days.

(21) Appl. No.: 17/122,181

(22) Filed: Dec. 15, 2020

(65) Prior Publication Data

US 2021/0194682 A1   Jun. 24, 2021

(30) Foreign Application Priority Data

Dec. 18, 2019  (KR) .................. 10-2019-0170252

(51) Int. Cl.
| | |
|---|---|
| H04L 9/08 | (2006.01) |
| H04B 10/548 | (2013.01) |
| H04B 10/64 | (2013.01) |
| H04B 10/70 | (2013.01) |

(52) U.S. Cl.
CPC ......... *H04L 9/0852* (2013.01); *H04B 10/548* (2013.01); *H04B 10/64* (2013.01); *H04B 10/70* (2013.01)

(58) Field of Classification Search
None
See application file for complete search history.

(56) References Cited

U.S. PATENT DOCUMENTS

| | | | |
|---|---|---|---|
| 2006/0239463 A1* | 10/2006 | Young .................... | H04B 10/70 380/263 |
| 2009/0074192 A1* | 3/2009 | Beal ....................... | H04L 9/0858 380/278 |
| 2010/0299526 A1* | 11/2010 | Wiseman ............... | H04L 63/061 713/171 |
| 2020/0169397 A1* | 5/2020 | Li ........................... | H04B 10/524 |
| 2020/0204362 A1* | 6/2020 | Li ........................... | G06N 10/00 |
| 2020/0304300 A1 | 9/2020 | Rhee et al. | |

FOREIGN PATENT DOCUMENTS

KR          101833956 B1       3/2018

OTHER PUBLICATIONS

Wang et al., "High key rate continuous-variable quantum key distribution with a real local oscillator", Optics Express, 2018, pp. 2794-2806, vol. 26, No. 3.

\* cited by examiner

*Primary Examiner* — Darren E Wolf
(74) *Attorney, Agent, or Firm* — The Webb Law Firm

(57) ABSTRACT

Disclosed is a time division quadrature homodyne CV QKD system, and a continuous variable quantum key distribution system which includes: a transmitter generating an optical pulse of quantum state data by using continuous light according to data of a transmission target encryption key; and a receiver separating the optical pulse received from a channel into two paths and fixing phases of two signals having a time difference of one period of the optical pulse to orthogonal phases, and then generating bit information through state detection by a time division homodyne detection from interacted signals.

9 Claims, 3 Drawing Sheets

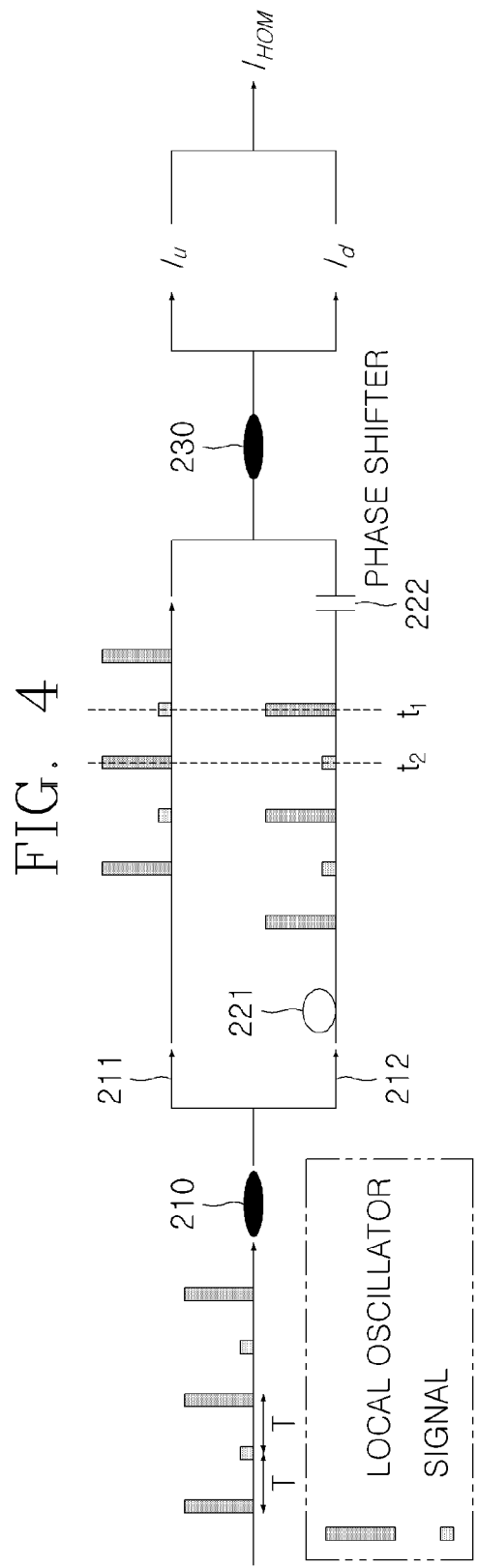

TIME DIVISION QUADRATURE HOMODYNE CV QKD SYSTEM

CROSS-REFERENCE TO RELATED APPLICATIONS

This application claims priority to Korean Patent Application No. 10-2019-0170252 filed Dec. 18, 2019, the disclosure of which is hereby incorporated by reference in its entirety.

TECHNICAL FIELD

The present invention relates to a continuous variable quantum key distribution (CV QKD) system, and particularly, to a CV QKD system that is robust against polarization fluctuation by applying a balanced detector so as to show an effect of heterodyne detection by time division quadrature homodyne detection.

BACKGROUND ART

In a general continuous variable quantum key distribution system, a transmitter (Alice) generates a pulse wave through an amplitude modulator (AM) for continuous light, and then separates the generated pulse signal into a signal pulse and a local oscillator (LO) pulse by a polarization beam splitter (PBS). Next, the signal pulse is modulated to a desired data value through an amplitude modulator (AM) and a phase modulator (PM). Thereafter, the modulated signal pulse and the LO pulse having polarizations perpendicular to each other through the polarization beam splitter (PBS) are combined and output to an optical fiber channel.

In a receiver (Bob), first, the signal received through the channel is corrected for polarization fluctuation flowing through the channel through a dynamic polarization controller (DPC). The corrected signal is divided into the signal pulse and the LO pulse again through the polarization beam splitter (PBS), and a reference phase (0 degree or 90 degrees) of the LO pulse to determine the quadrature of a homodyne detector through a phase modulator (PM) is arbitrarily modulated, and the signal pulse and the LO pulse are combined through a beam splitter (BS) to perform state detection according to a homodyne method.

However, in conventional continuous variable quantum key distribution (CV QKD), two sets of optical interferometers are required for an I-Q orthogonal homodyne detection so-called heterodyne detection, and a polarization beam splitter and a dynamic polarization controller are required, and as a result, cost may increase and secrecy of a quantum-level signal pulse and a strong signal LO pulse may be significantly reduced by the polarization fluctuation by a channel attack of the attacker (Eve).

SUMMARY OF THE INVENTION

Accordingly, the present invention is contrived to solve the problem and two sets of optical interferometers are required in measuring an I-Q orthogonal homodyne in the existing continuous variable quantum encryption technology, but the present invention has been made in an effort to provide a continuous variable quantum key distribution system capable of measuring an I-Q orthogonal homodyne (heterodyne) with one set of interferometer.

The present invention has been made in an effort to provide a continuous variable quantum key distribution system which does not require a polarization beam splitter and a dynamic polarization controller at a receiving side and is suitable for a short-haul access network at low cost, by applying one balanced detector so as to show an effect of heterodyne detection by time division quadrature homodyne detection.

An exemplary embodiment of the present invention provides a continuous variable quantum key distribution system including: a transmitter generating an optical pulse of quantum state data by using continuous light according to data of a transmission target encryption key; and a receiver separating the optical pulse received from a channel into two paths and fixing a phase to a predetermined phase difference (e.g., 45 degrees or odd-number multiples of it) for two signals having a time difference of one period of the optical pulse and then, generating bit information through state detection by a time division homodyne detection from interacted signals.

The transmitter may include a first amplitude modulator generating a pulse wave including a signal pulse and an LO pulse through amplitude modulation for the continuous light according to the data of the transmission target encryption key, and an IQ data modulator generating the optical pulse of coherent quantum state data through amplitude modulation and phase modulation for the pulse wave.

The pulse wave may include the signal pulse and the LO pulse repeatedly generated with the time difference of one period.

The IQ data modulator may perform the amplitude modulation and the phase modulation by using a random Gaussian distribution value.

The receiver may include a first coupler separating the optical pulse received from the channel and outputting a first separation signal and a second separation signal to two paths, respectively, a delay line delaying one period of the optical pulse for the first separation signal or the second separation signal, a phase shifter varying an optical phase of one of the two signals so that a relative optical phase of the two signals having the time difference of one period of the optical pulse is varied according to a phase control signal, a second coupler interacting the two signals having the time difference of one period of the optical pulse and outputting a first interference signal and a second interference signal to two paths, after the optical phase of one of the two signals is varied, and a balanced detector generating the phase control signal from the first interference signal and the second interference signal and generating bit information through the state detection by the time division homodyne detection.

The balanced detector may generate the phase control signal for fixing the phase.

The balanced detector may generate the phase control signal so that an I component and a Q component can be extracted in a result by a homodyne detection method according to the phase difference in which an interfered output pulse of the first interference signal and the second interference signal is fixed.

The balanced detector may generate the phase control signal so that a sum of the I component and the Q component and a difference of the I component and the Q component are alternately shown in the result by the homodyne detection method for the first interference signal and the second interference signal by making the phase difference be 45 degrees or odd-number multiples of it.

Another exemplary embodiment of the present invention provides a continuous variable quantum key distribution method including: generating an optical pulse of quantum state data by using continuous light according to data of a transmission target encryption key; and separating the optical pulse received from a channel into two paths and fixing a phase to have a predetermined phase difference for two signals having a time difference of one period of the optical pulse and then, generating bit information through state detection by a time division homodyne detection from interacted signals.

According to an exemplary embodiment of the present invention, by a continuous variable quantum key distribution system, a continuous variable quantum key distribution system can be provided which does not require a polarization beam splitter and a dynamic polarization controller at a receiving side and is suitable for a short-haul access network at low cost, by applying one balanced detector so as to show an effect of heterodyne detection by time division quadrature homodyne detection.

According to an exemplary embodiment of the present invention, by a continuous variable quantum key distribution system, a signal pulse and an LO pulse are not separately transmitted, and as a result, there is no influence by polarization fluctuation which occurs in a channel and a system.

According to an exemplary embodiment of the present invention, by a continuous variable quantum key distribution system, separated signals of an optical pulse received by the receiving side have a time difference corresponding to one period (T) of the optical pulse and a phase is fixed to a predetermined phase and data of each odd period and even period is time-divided and each divided data can be detected by a homodyne method, thereby acquiring a maximum key transmission rate.

According to an exemplary embodiment of the present invention, by a continuous variable quantum key distribution system, since excess noise by LO pulse leakage which occurs in the existing detection method need not be considered, the continuous variable quantum key distribution system is very effective in terms of reducing the excess noise.

BRIEF DESCRIPTION OF THE DRAWINGS

In order to help understand the present invention, the accompanying drawings which are included as a part of the Detailed Description provide embodiments of the present invention and describe the technical spirit of the present invention together with the Detailed Description.

FIG. 4 is a diagram for describing an exemplary embodiment of state detection of a receiver (Bob) according to the present invention.

DETAILED DESCRIPTION

Figure 1:
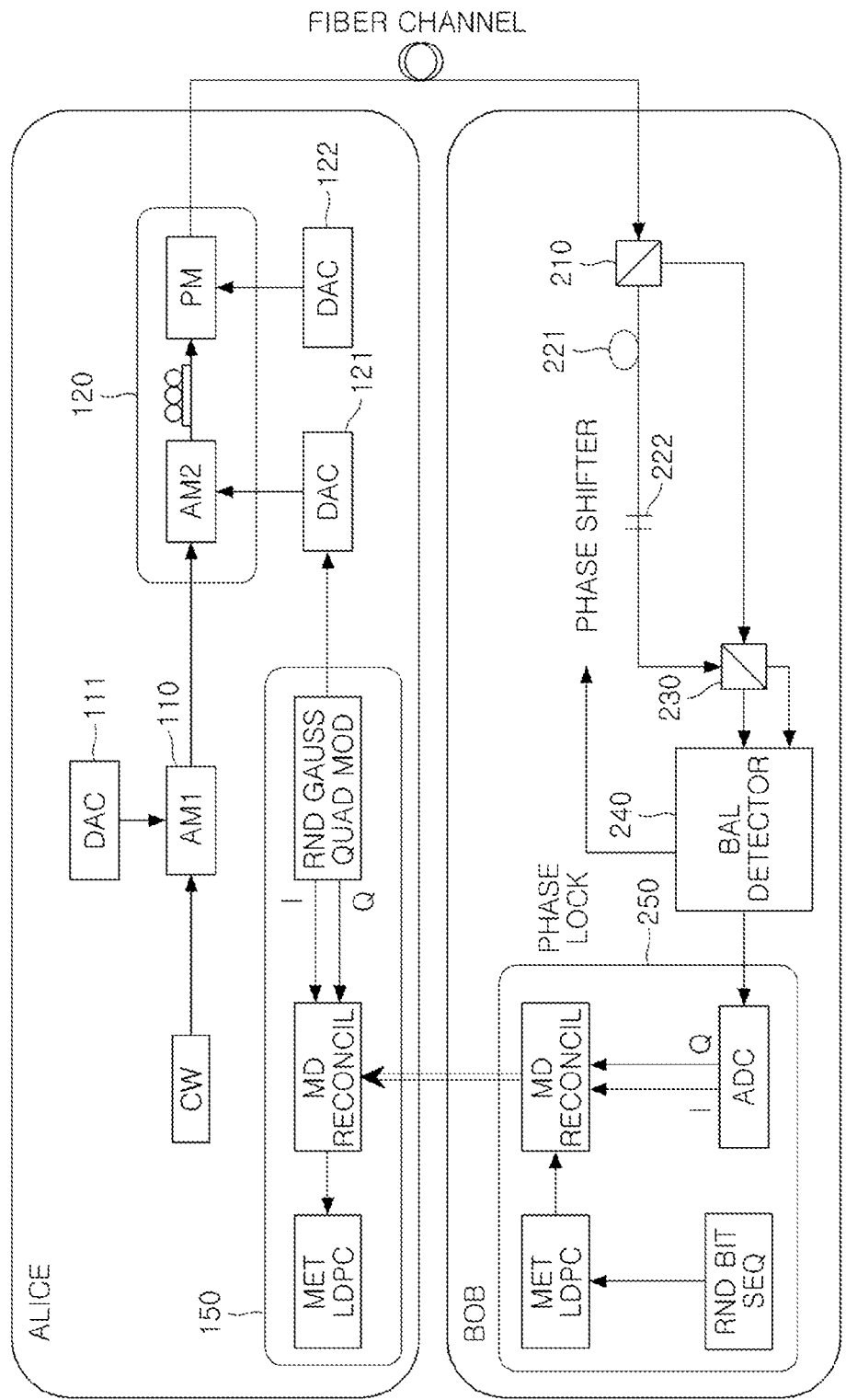
FIG. 1 is a diagram for describing a system for continuous variable quantum key distribution (CVQKD) according to an exemplary embodiment of the present invention.

Hereinafter, the present invention will be described in detail with reference to the accompanying drawings. In this case, the same components in each drawing are represented by the same reference numerals as much as possible. In addition, detailed descriptions of already known functions and/or configurations are omitted. The following description focuses on parts necessary for understanding the operation according to various embodiments, and descriptions of elements that may obscure the gist of the description are omitted. In addition, some components of the drawings may be exaggerated, omitted, or schematically illustrated. The size of each component does not entirely reflect the actual size, and thus the contents described herein are not limited by the relative size or spacing of the components drawn in the respective drawings.

In describing the exemplary embodiments of the present invention, a detailed description of the known art related with the present invention will be omitted when it is judged that the detailed description may unnecessarily make the gist of the present invention unclear. In addition, terms to be described below as terms which are defined in consideration of functions in the present invention may vary depending on the intention of a user or an operator or usual practice. Accordingly, the terms need to be defined based on contents throughout this specification. Terms used in a detailed description are to just describe the exemplary embodiments of the present invention and should not be restrictive in any way. Unless specifically used otherwise, expression of a singular form includes a meaning of a plural form. In the present description, an expression such as "including" or "comprising" is intended to indicate certain features, numbers, steps, operations, elements, some or combinations thereof and should not be construed to preclude the presence or possibility of one or more other features, numbers, steps, operations, elements, some or combinations thereof in addition to the described things.

Terms including as first, second, and the like are used for describing various constituent elements, but the constituent elements are not limited by the terms and the terms are used only for distinguishing one constituent element from other constituent elements.

FIG. 1 is a diagram for describing a system 100 for continuous variable quantum key distribution (CVQKD) according to an embodiment of the present invention.

Referring to FIG. 1, the system 100 for continuous variable quantum key distribution (CVQKD) according to an exemplary embodiment of the present invention includes a transmitter (Alice) and a receiver (Bob) which optically communicate with each other on a channel (optical transmission path or quantum channel, etc.).

The transmitter (Alice) and the receiver (Bob) may be included in various optical communication equipments on a network, i.e., a network providing a public channel, such as a wired/wireless Internet, a mobile communication network, etc. For example, Ethernet equipment, L2/L3 equipment, a server on the network, etc., may include a transmitter (Alice) and a receiver (Bob) for providing or receiving the quantum encryption key according to the continuous-variable quantum key distribution protocol in order to transmit and receive mutually required data through optical communication.

The transmitter (Alice) generates an optical pulse of quantum state data by using continuous wave laser (CW Laser) (e.g., a wavelength of 1550 nm) for a predetermined coded encryption key corresponding to an encryption key to be transmitted and transmits the generated optical pulse to the quantum channel (optical transmission path).

The receiver (Bob) separates the optical pulse of the quantum state data received through the quantum channel (optical transmission path) into two paths and fixes two signals having a time difference of one period of the optical pulse to a predetermined phase difference (e.g., 45 degrees or odd-number multiples of it) and then, generates bit information through state detection by a time division homodyne detection from above interacted signals.

As illustrated in FIG. 1, the transmitter (Alice) includes a first amplitude modulator 110, an IQ data modulator 120, and a post-processing unit 150, and further includes a first digital to analog converter (DAC) 111, a second DAC 121, and a third DAC 122 for operations thereof.

The receiver (Bob) includes a first coupler 210, a delay line 221, a phase shifter 222, a second coupler 230, a balanced detector 240, and a post-processing unit 250.

Figure 2:
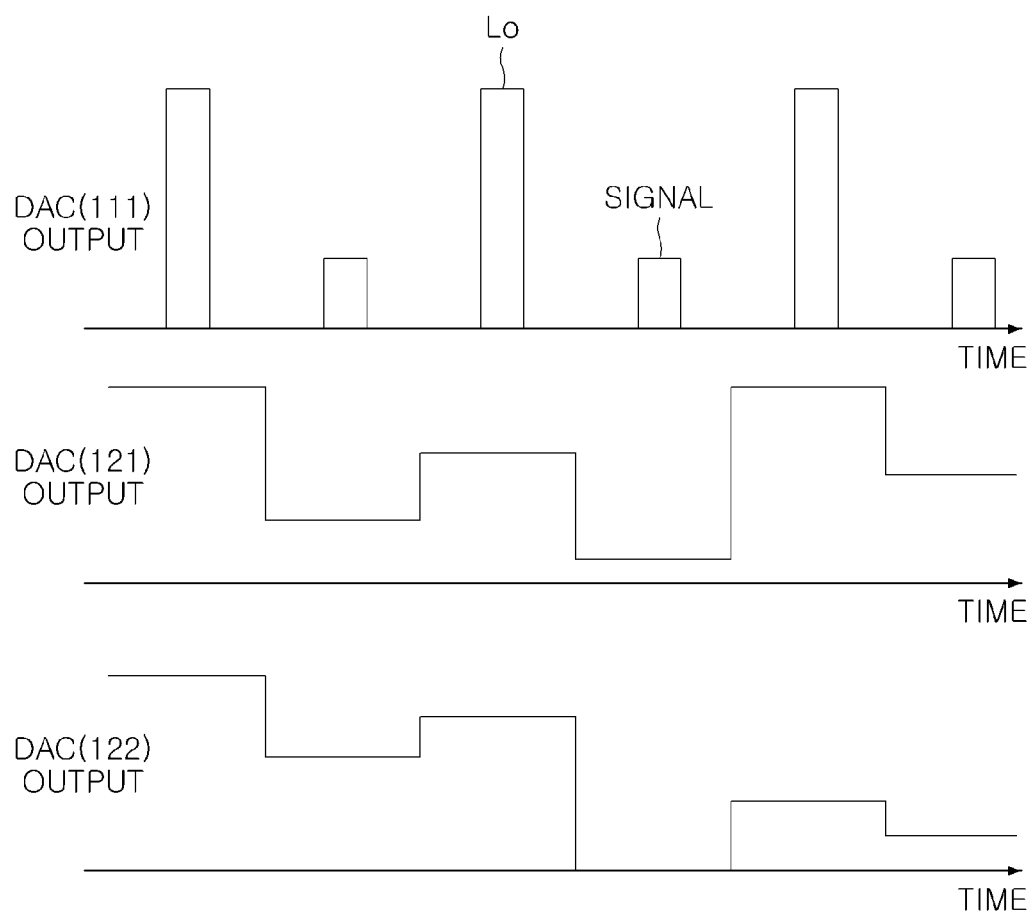
FIG. 2 is a diagram for describing an exemplary embodiment of IQ modulation of a transmitter (Alice) according to the present invention.

FIG. 2 is a diagram for describing an exemplary embodiment of IQ modulation of a transmitter (Alice) according to the present invention.

The transmitter (Alice) generates an optical pulse of quantum state data by using CW Laser for a predetermined coded encryption key corresponding to an encryption key to be transmitted and transmits the generated optical pulse to the quantum channel (optical transmission path).

To this end, the first amplitude modulator 110 corresponds to a carving modulator that periodically and repeatedly generates a pulse wave including a signal pulse and a local oscillator (LO) pulse through amplitude modulation for the continuous light according to data of a transmission target encryption key. The first amplitude modulator 110 uses an output of the first DAC 111 according to the data of the encryption key to be transmitted, as illustrated in FIG. 2, to generate a pulse wave including the signal pulse and the LO pulse by modulation of the continuous light according to a magnitude of an alternating signal between the signal pulse and the LO pulse section.

The IQ data modulator 120 generates the optical pulse of coherent quantum state data as the quantum state data and transmits the generated optical pulse to the quantum channel (optical transmission path) through amplitude modulation by the second amplitude modulator AM2 and phase modulation by the phase modulator PM for the pulse wave from the first amplitude modulator 110.

The IQ data modulator 120 performs the phase modulation by the amplitude modulation by the second amplitude modulator AM2 and the phase modulation by the phase modulator PM by using a predetermined random Gaussian distribution value from a random (RND) Gauss quadrature modulation unit of the post-processing unit 150. The predetermined random Gaussian distribution value (I, Q) generated by the random (RND) Gauss quadrature modulation unit of the post-processing unit 150 is provided to a multi-dimensional (MD) reconciliation unit.

For example, the second DAC 121 and the third DAC 122 output signals corresponding thereto as illustrated in FIG. 2 according to the random Gaussian distribution value to become the optical pulse of the quantum state data transmitted. Accordingly, the IQ data modulator 120 may generate the optical pulse of the quantum state data and transmit the generated optical pulse to the quantum channel (optical transmission path) through amplitude modulation by the second amplitude modulator AM2 and phase modulation by the phase modulator PM for the pulse wave from the first amplitude modulator 110.

Figure 3:
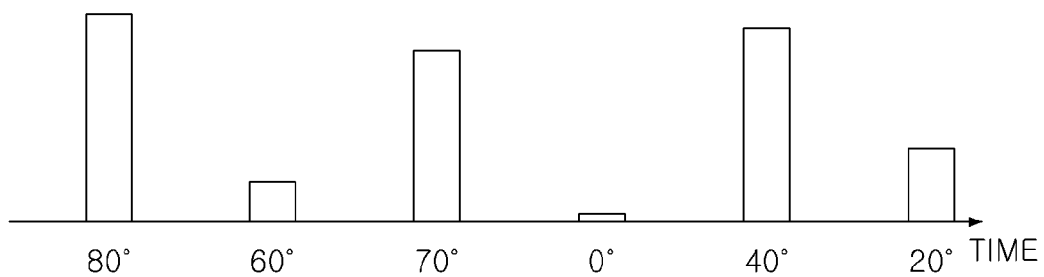
FIG. 3 is a diagram for describing an exemplary embodiment of a transmission optical pulse of a transmitter (Alice) according to the present invention.

FIG. 3 is a diagram for describing an exemplary embodiment of a transmission optical pulse of a transmitter (Alice) according to the present invention.

As illustrated in FIG. 3, the IQ data modulator 120 may generate and output periodic (period T) optical pulses, and transmit the optical pulse of the quantum state data to the quantum channel (optical transmission path).

In FIG. 2, the output of the third DAC 122 shows an example of a phase modulation value in the phase modulator PM (e.g., phase angles of 80, 60, 70, 0, 40, 20, . . . ), and the phase modulator PM of the IQ data modulator 120 may transmit, to the quantum channel (optical transmission path), an optical pulse including the corresponding amplitude and phase modulation values (e.g., phase angels of 80, 60, 70, 0, 40, 20, . . . ) through the phase modulation for the output of the second amplitude modulator AM2 according to the phase modulation value (e.g., phase angles of 80, 60, 70, 0, 40, 20, . . . ) for each period (T) interval, for example.

FIG. 4 is a diagram for describing an exemplary embodiment of state detection of a receiver (Bob) according to the present invention.

The receiver (Bob) separates the optical pulse of the quantum state data received from the transmitter (Alice) through the quantum channel (optical transmission path) into two paths and fixes two signals having a time difference of one period of the optical pulse to a predetermined phase difference (e.g., 45 degrees or odd-number multiples of it) and then, generates bit information through state detection by a time division homodyne detection from above interacted signals again.

To this end, the first coupler 210 separates the optical pulse received from the quantum channel (optical transmission path) and outputs a first separation signal 211 and a second separation signal 212 to two paths, respectively. The first coupler 210 may be a beam splitter.

The delay line 221 delays one period T of the optical pulse for one of the first separation signal 211 or the second separation signal 212. In the drawing, it is illustrated that the delay line 221 is provided on the path of the second separation signal 212, but in some cases, the delay line 221 may be provided on the path of the first separation signal 211.

The phase shifter 222 adjusts a relative optical phase of the two signals to be varied, that is, the two signals to have a predetermined phase difference (e.g., 45 degrees or odd-number multiples of it) by varying one optical phase between the two signals having the time difference of one period of the optical pulse according to a phase control signal from the balanced detector 240. As an example, the phase shifter 222 may be a module type in which an optical fiber is wound around a piezo film type actuator. The actuator may vary the optical phase by adjusting an optical fiber path length according to an electrical signal. In the drawing, it is illustrated that the phase shifter 222 is provided on the path of the second separation signal 212, but in some cases, the phase shifter 222 may be provided on the path of the first separation signal 211.

The second coupler 230 receives the two signals 211 and 212 having the time difference of one period T of the optical pulse based on the delay line 221, and receives the two signals 211 and 212 having the time difference after varying one optical phase between the two signals. That is, one of the two input signals is input as a signal whose optical phase is changed based on the phase shifter 222. The second coupler 230 outputs a first interference signal Iu and a second interference signal Id through two paths, respectively. The second coupler 230 may be the beam splitter. The first interference signal Iu and the second interference signal Id may be a signal corresponding to a power of a sum of the two signals 211 and 212 and a signal corresponding to a power of a difference of the two signals 211 and 212, respectively.

The balanced detector 240 (or the balance photodetector) generates the phase control signal from the first interference signal Iu and the second interference signal Id and feeds the generated phase control signal back to the phase shifter 222 to control the phases of the first and second separation signals 211 and 212 to be fixed to a predetermined phase difference (e.g., 45 degrees or odd-number multiples of it) and generate bit information from the first interference signal Iu and the second interference signal Id through the state detection by the time division homodyne method.

For example, the balanced detector 240 generates the phase control signal so that an in-phase (I) component and a quadrature-phase (Q) component are shown (extracted) in a result by the homodyne detection method according to the phase difference (e.g., 45 degrees or odd-number multiples of it) in which an interfered output pulse of the first interference signal Iu and the second interference signal Id from the second coupler 230 is fixed. That is, the phase control signal for phase lock is generated and fed back so that the two signals 211 and 212 input into the second coupler 230 have a predetermined phase difference (e.g., 45 degrees or odd-number multiples of it). For example, the balanced detector 240 may control the sum of the I component and the Q component and the difference of the I component and the Q component to be alternately shown (extracted) in the result by homodyne detection method for the first interference signal Iu and the second interference signal Id by making the phase difference between the two signals 211 and 212 input into the second coupler 230 be 45 degrees or odd-number multiples of it.

Meanwhile, while the first separation signal 211 and the second separation signal 212 have the time difference of one period T of the optical pulse, the balanced detector 230 fixes the phase so that the optical phase difference of two signals has a predetermined phase difference (e.g., 45 degrees or odd-number multiples of it) to load and transmit data at, for example, t1=T and t2=2T as illustrated in FIG. 4, and as a result, data of each odd period and even period is time-divided and each divided data may be thus detected by the homodyne method, thereby acquiring a maximum key transmission rate Besides, in the present invention, since excess noise by LO pulse leakage which occurs in the existing detection method need not be considered, the continuous variable quantum key distribution system is very effective in terms of reducing the excess noise.

For example, the balanced detector 240 performs the state detection according to the homodyne method for the received quantum state data corresponding to the coded encryption key to generate the corresponding electrical signal, i.e., bit information (digital code). For the state detection, a difference signal $I_{HOM}$ of the first interference signal Iu and the second interference signal Id may be used. Further, the difference signal $I_{HOM}$ in the balanced detector 240 is provided to the analog to digital converter (ADC) of the post-processing unit 250.

In order to match the transmission target encryption key transmitted by the transmitter (Alice) and the bit information detected by the receiver (Bob), the corrected quantum encryption key is calculated and shared by applying post-processing, i.e., an error correction technique and a privacy amplification technique to the corresponding bit information generated by performing the state detection in the balanced detector 240. The post-processing unit 250 of the receiver (Bob) and the post-processing unit 150 of the transmitter (Alice) perform such a post-processing process.

For example, in the post-processing unit 250 of the receiver (Bob), the multidimensional reconciliation unit performs error correction by using values I and Q output by the analog to digital converter (ADC) for a Multi-edge-type Low Density Parity Check code generated by using a random bit sequence generation unit (RND Bit Seq) and the output of the balanced detector 240, i.e., the difference signal $I_{HOM}$ of the first interference signal Iu and the second interference signal Id. The multidimensional reconciliation unit transmits, to the transmitter (Alice), information depending on an error correction result through a public channel to allow the transmitter (Alice) to use the transmitted information for the error correction.

In the post-processing unit 150 of the transmitter (Alice), for example, the multidimensional reconciliation unit may generate the Multi-edge-type Low Density Parity Check code by performing the error correction by using the random (RND) Gauss quadrature modulation unit (RND Gauss Quad Mod). The multidimensional reconciliation unit may perform the error correction by using the multidimensional predetermined random Gaussian distribution values I and Q generated by the RND Gauss Quad Mod and receiving the information depending on the error correction result from the post-processing unit 250 of the receiver (Bob).

According to an exemplary embodiment of the present invention, a continuous variable quantum key distribution system 100 can be provided which does not require a polarization beam splitter and a dynamic polarization controller at a receiver (Bob) and is suitable for a short-haul access network at low cost, by applying one balanced detector 240 so as to show an effect of heterodyne detection by time division quadrature homodyne detection. Further, a signal pulse and an LO pulse are not separately transmitted, and as a result, there is no influence of polarization shaking which occurs in a channel and a system.

According to an exemplary embodiment of the present invention, by the continuous variable quantum key distribution system 100, separated signals of an optical pulse received by the receiver (Bob) have a time difference corresponding to one period (T) of the optical pulse and a phase is fixed to a predetermined phase difference (e.g., 45 degrees or odd-number multiples of it) and data of each odd period and even period are time-divided and each divided data can be detected by a homodyne method, thereby acquiring a maximum key transmission rate. In addition, in the present invention, since excess noise by LO pulse leakage which occurs in the existing detection method need not be considered, the continuous variable quantum key distribution system is very effective in terms of reducing the excess noise.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from a scope without departing from an essential characteristic of the present invention. Accordingly, the spirit of the present invention should not be defined only by the described embodiments, and it should be appreciated that claims to be described below and all technical spirit which is equivalent to the claims or equivalently modified is included in the claim of the present invention.

What is claimed is:

1. A continuous variable quantum key distribution system comprising:
   a transmitter generating an optical pulse of quantum state data by using continuous light according to data of a transmission target encryption key,
   wherein the transmitter includes:
   a first amplitude modulator generating a pulse wave including a signal pulse and an LO pulse through amplitude modulation for the continuous light according to the data of the transmission target encryption key, and an IQ data modulator generating the optical pulse of the quantum state data through amplitude modulation and phase modulation for the pulse wave, and a receiver which receives the optical pulse from a quantum channel, separates the optical pulse into two paths and fixes a phase to a predetermined phase difference for two signals having a time difference of one period of the optical pulse, and then generates bit information through state detection by a time division homodyne detection from above interacted signals.

2. The continuous variable quantum key distribution system of claim 1, wherein the phase difference is 45 degrees, or odd-number multiples of it.

3. The continuous variable quantum key distribution system of claim 1, wherein the pulse wave includes the signal pulse and the LO pulse repeatedly generated with the time difference of one period.

4. The continuous variable quantum key distribution system of claim 1, wherein the IQ data modulator performs the amplitude modulation and the phase modulation by using a random Gaussian distribution value.

5. The continuous variable quantum key distribution system of claim 1, wherein the receiver includes, a first coupler separating the optical pulse received from the quantum channel and outputting a first separation signal and a second separation signal to two paths, respectively, a delay line delaying one period of the optical pulse for the first separation signal or the second separation signal, a phase shifter varying an optical phase of one of the two signals so that a relative optical phase of the two signals having the time difference of one period of the optical pulse is varied according to a phase control signal, a second coupler interacting the two signals having the time difference of one period of the optical pulse and outputting a first interference signal and a second interference signal to two paths, after the optical phase of one of the two signals is varied, and a balanced detector generating the phase control signal from the first interference signal and the second interference signal and generating bit information through the state detection by the time division homodyne method.

6. The continuous variable quantum key distribution system of claim 5, wherein the balanced detector generates the phase control signal for fixing the phase.

7. The continuous variable quantum key distribution system of claim 5, wherein the balanced detector generates the phase control signal so that an I component and a Q component are interference and shown in a result by a homodyne detection method according to the phase difference in which an interfered output pulse of the first interference signal and the second interference signal is fixed.

8. The continuous variable quantum key distribution system of claim 7, wherein the balanced detector generates the phase control signal so that a sum of the I component and the Q component and a difference of the I component and the Q component are alternately shown in the result by the homodyne detection method with the first interference signal and the second interference signal by making the phase difference be 45 degrees or odd-number multiples of it.

9. A continuous variable quantum key distribution method comprising:

generating an optical pulse of quantum state data by using continuous light according to data of a transmission target encryption key; and separating the optical pulse received from a quantum channel into two paths and fixing a phase to a predetermined phase difference for two signals having a time difference of one period of the optical pulse, and then generating bit information through state detection by a time division homodyne detection from above interacted signals, wherein the generating the optical pulse includes:

generating a pulse wave including a signal pulse and an LO pulse through amplitude modulation for the continuous light according to the data of the transmission target encryption key, and generating the optical pulse of the quantum state data through amplitude modulation and phase modulation for the pulse wave.

* * * * *